US006300966B1

United States Patent
Gregory et al.

(10) Patent No.: US 6,300,966 B1
(45) Date of Patent: Oct. 9, 2001

(54) METHOD OF PROVIDING ON-SCREEN NOTIFICATION OF NON-VISIBLE ALARMED NETWORK ELEMENTS

(75) Inventors: Cameron Gregory; Constance Atwater McClary, both of Red Bank; Magda Nour, Belford, all of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/211,892

(22) Filed: Dec. 15, 1998

(51) Int. Cl.⁷ ....................................................... G06F 3/14

(52) U.S. Cl. ...................... 345/736; 709/223; 709/224; 340/990; 340/995; 345/734; 345/737; 345/786; 345/771

(58) Field of Search .................................... 709/223, 224; 345/969, 341, 339, 970, 348, 349, 440; 340/990, 995

(56) References Cited

U.S. PATENT DOCUMENTS

| 5,261,044 | * | 11/1993 | Dev | 345/357 |
|---|---|---|---|---|
| 5,696,486 | * | 12/1997 | Poliquin | 340/506 |
| 5,886,698 | * | 3/1999 | Sciammarella | 345/349 |
| 5,896,132 | * | 4/1999 | Berstis | 345/341 |

\* cited by examiner

*Primary Examiner*—Raymond J. Bayerl
*Assistant Examiner*—Thomas T. Nguyen
(74) *Attorney, Agent, or Firm*—Jean-Marc Zimmerman

(57) ABSTRACT

A method for providing on-screen notification of alarmed elements of a managed network system, wherein an alarm icon continuously displayed on a video display screen indicates when at least one network element not visible on the video display screen is alarmed. The video screen includes a view pane which displays the map containing icon representations of elements of the network system, the map being moveable within the view pane to permit all regions of the map to be selectively viewed, wherein at least one of the network element icons is not visible in the view pane at any given time.

16 Claims, 1 Drawing Sheet

METHOD OF PROVIDING ON-SCREEN NOTIFICATION OF NON-VISIBLE ALARMED NETWORK ELEMENTS

FIELD OF INVENTION

This invention relates to network element management systems, and particularly to an icon for a network management system which provides on-screen notification of alarmed network elements that are not visible to a network operator.

BACKGROUND OF THE INVENTION

Communications networks are used by businesses, governments and universities for many different purposes, including communications and data processing. Such networks often employ computer-based network management systems to access and obtain information from and about various elements of the network, such as its equipment and facilities. Network operators use this information to perform the requisite tasks needed to keep the network operating properly.

Network information obtained by conventional network management systems is typically presented to a network operator on a video display screen in the form of a map of icons representing the different elements of a network. The operator can access information pertaining to a particular network element by clicking on the appropriate icon. When the operational state of a monitored network element comes into question, the network element generates an alarm represented by the corresponding icon which alerts the operator to the problem so that it can be cleared.

Such conventional alarms suffer from a significant drawback. Specifically, they may not be continuously visible to network operator while other network management tasks are in progress because the map-like representations of network elements are often larger than the viewable area of the video display screen. Consequently, certain regions of the map will be outside the viewing area of the video display screen at any given time. Thus, when a network operator wants to view a region of the map outside the immediate viewing area of the video display screen, the operator must move the map around to view that region. If an alarmed icon is generated in a region of the map outside the immediate viewing area of the video display screen, it will not be noticed by the user. This in turn, can unnecessarily delay clearing a network problem.

SUMMARY

A method for providing on-screen notification of alarmed elements of a managed network system comprising a video display screen for displaying a map containing icon representations of elements of the network system, wherein the map is moveable on the video display screen to permit all regions of the map to be selectively viewed, and wherein an alarm icon continuously displayed on the video display screen indicates when at least one network element not visible on the video display screen is alarmed.

BRIEF DESCRIPTION OF THE DRAWINGS

A more complete understanding of the present invention may be obtained from consideration of the following detailed description in conjunction with the accompanying drawings in which.

DETAILED DESCRIPTION OF THE INVENTION

Figure 1:
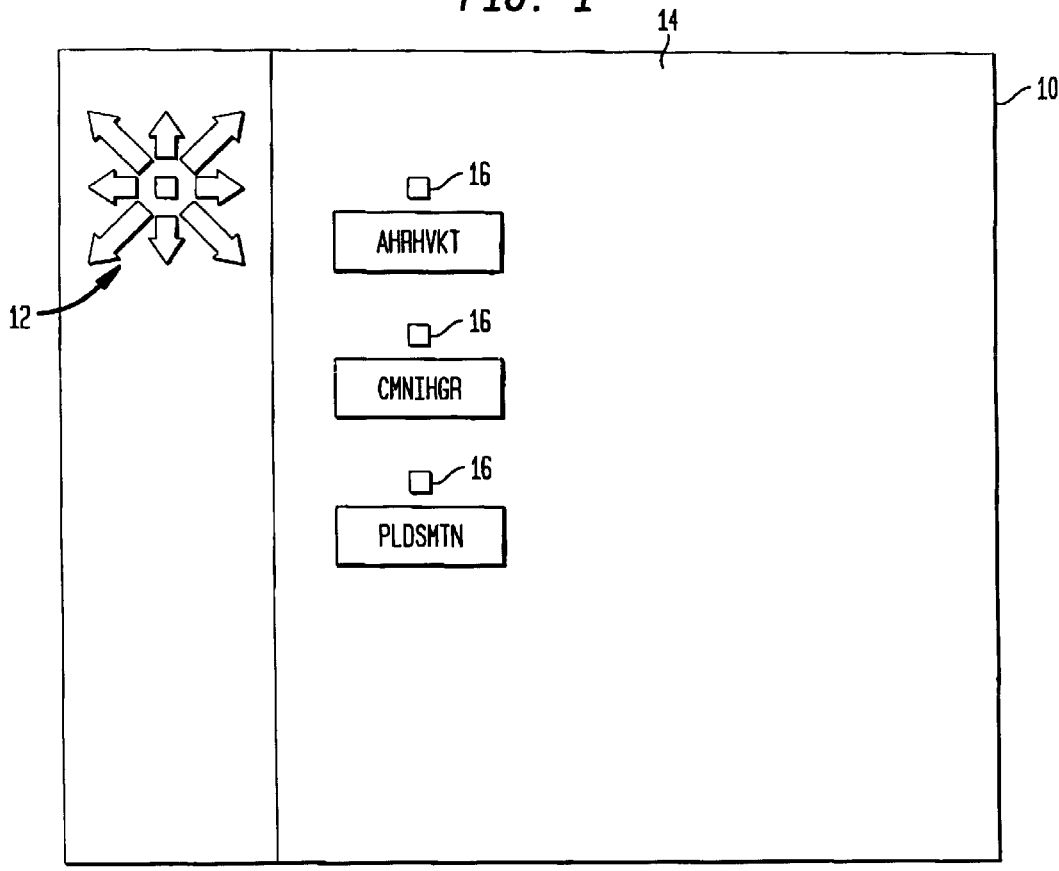
FIG. 1 shows a video display screen generated by a network management system that displays an alarm directional button (ADB) icon according to the present invention.

FIG. 1 shows a video display screen 10 generated by a network management system that displays an alarm directional button (ADB) icon 12 according to the present invention. The video display screen 10 conventionally displays a view pane 14 of a map containing icon representations of network elements 16 of a network managed by the network management system. Since the map is larger than the view pane 14 shown by the video display screen 10, the map is moveable to enable regions of the map not visible in the view pane 14 to be viewed. The ADB 12 provides an on-screen indicator of alarms on network elements in regions of the map not visible in the view pane 14 by a network operator, thereby ensuring real-time alarm notification to the operator.

Figure 2:
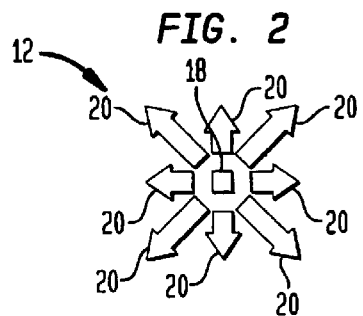
FIG. 2 shows the ADB icon.

The ADB icon 12 comprises nine areas corresponding to a center area and to compass headings north, north east, east, south east, south, south west, west and north west. In the embodiment shown in FIG. 2, the center area is represented by a central square 18 and the compass headings are represented by eight arrows 20, each pointing outwards away from the central square 18. The central square 18 corresponds to the region of the map visible in the view pane 14 of the video display screen 10. The arrows 20 provide a directional indication of the regions of the map which are not visible in the view pane 14.

The present invention operates as follows. When an alarm is received on a network element positioned in a region of the map not currently shown in the view pane 14 of the video display screen 10, the arrow 20 corresponding to that region of the map "lights up" to indicate that an alarm has been received but is not currently visible. This permits the network operator to reposition the map in the view pane 14 of the video display screen 10 so that the alarmed network element icon can be viewed. This is accomplished by moving the map in the direction indicated by the lighted arrow 20.

The center area of the ADB 12 represented by the central square 18 also operates in accordance with a filtering function which enables a network operator to select any network element icons on the map, including those not visible in the view pane 14, and make them invisible. When an alarm is received on such a filtered network element, the center square 18 of the ADB 12 lights up to alert the operator to the alarm.

The ADB of the present invention is especially useful in SONET/SDH network element management systems. However, the ADB of the present invention can also be used in any network management system that includes fault management methods.

It should be understood that the embodiments described herein are merely exemplary and that a person skilled in the art may make many variations and modifications to the embodiments utilizing functionally equivalent elements to those described herein. Any and all such variations or modifications as well as others which may become apparent to those skilled in the art, are intended to be included within the scope of the invention as defined by the appended claims.

What is claimed is:

1. A method for providing on-screen notification of alarmed elements of a managed network system, comprising the steps of:

providing a video display screen for displaying a map of a plurality of icon representations of elements of a network system, the map being moveable within the display screen to permit all regions of the map to be selectively viewed; and continuously displaying an image on the video display screen which indicates when at least one network element icon not visible on the video display screen is being alarmed, wherein the image is an alarm directional icon which indicates the direction of the at least one alarmed network element icon on the map.

2. The method according to claim 1, wherein the image becomes illuminated to indicate when at least one network element icon not visible on the video display screen is being alarmed.

3. The method according to claim 1, further comprising the step of filtering at least one network element icon so that it is not visible on the video display screen.

4. The method according to claim 3, further comprising the step of displaying an image on the video display screen which indicates when the filtered network element icon is being alarmed.

5. The method according to claim 1, wherein the image includes a section corresponding to a center position and sections corresponding to compass headings comprising north, north east, east, south east, south, south west, west, and north west.

6. The method according to claim 5, wherein the image sections corresponding to the north, north east, east, south east, south, south west, west, and north west compass headings are arrow-shaped.

7. A method for providing on-screen notification of alarmed elements of a managed network system, comprising the steps of:

providing a video display screen having a view pane for displaying a map containing icon representations of network elements of a network system, the map being moveable within the view pane to permit all regions of the map to be selectively viewed, wherein at least one of the network element icons is not visible in the view pane at any given time;

displaying an image on the display screen which becomes illuminated to indicate when the at least one network element not visible in the view pane of the video display is being alarmed, wherein the image includes a section which corresponds to the region of the map visible in the view pane, the section corresponding to the region of the map visible in the view pane is centrallylocated in the image, and the image includes a plurality of sections disposed around the centrally-located section of the image, wherein the plurality of sections correspond to a plurality of compass directions measured relative to the region of the map visible in the view pane.

8. The method according to claim 7, wherein the image is an alarm directional icon which indicates the direction in which to move the map to find the at least one alarmed network element icon.

9. The method according to claim 7, wherein at least two network element icons are visible in the view pane, and further comprising the step of filtering at least one of the at least two network element icons so that it is not visible in the view pane of the video display screen.

10. The method according to claim 9, further comprising the step of displaying an image on the display screen which indicates that the filtered network element is being alarmed.

11. The method according to claim 7, wherein the compass directions include north, north east, east, south east, south, south west, west, and north west.

12. The method according to claim 11, wherein the compass direction sections of the image are arrow-shaped.

13. The method according to claim 12, wherein each arrow-shaped compass direction section points away from the centrally-located section in a direction corresponding a different compass heading.

14. The method according to claim 7, wherein the image includes a section corresponding to a center area and sections corresponding to compass directions comprising north, north east, east, south east, south, south west, west, and north west.

15. The method according to claim 14, wherein the image sections corresponding to the north, north east, east, south east, south, south west, west, and north west compass directions are arrow-shaped.

16. The method according to claim 15, wherein each arrow-shaped compass direction section points away from the center position in a direction corresponding to its compass heading.

* * * * *